(12) United States Patent
Acharya et al.

(10) Patent No.: US 7,317,728 B2
(45) Date of Patent: Jan. 8, 2008

(54) SYSTEM AND METHOD FOR INCREASING PROVISIONABLE BANDWIDTH IN TIME-DIVISION MULTIPLEXED COMMUNICATION LINKS

(75) Inventors: Swarup Acharya, New Providence, NJ (US); Bhawna Gupta, Edison, NJ (US); Pankaj Risbood, Roselle, NJ (US); Anurag Srivastava, Roselle, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1048 days.

(21) Appl. No.: 10/374,871

(22) Filed: Feb. 25, 2003

(65) Prior Publication Data
US 2004/0165540 A1 Aug. 26, 2004

(51) Int. Cl.
*H04L 12/43* (2006.01)
(52) U.S. Cl. ............... 370/395.51; 370/458; 370/477; 370/907
(58) Field of Classification Search ............ None
See application file for complete search history.

(56) References Cited
U.S. PATENT DOCUMENTS
5,960,002 A * 9/1999 Ramfelt et al. ............ 370/450

OTHER PUBLICATIONS

Hunter, Dynamic Routing, Rearrangement, and Defragmentation in WDM Ring Networks, IEEE, pp. 168-170, 2000.*
Schrijver et al, The Ring Loading Problem, Siam J. Discrete Math, vol. 11, No. 1, pp. 1-14, Feb. 2000.*
ANSI Standards Document T1.105-2001 "Synchronous Optical Network (SONET) Basic Description including Multiplex Structure, Rates and Formats"; 115 pages; Jul. 2002.
ITU-T G.707/Y.1322 "Network Node Interface for the Synchronous Digital Hierarchy (SDH)"; 123 pages; Oct. 2000.

* cited by examiner

*Primary Examiner*—Frank Duong

(57) ABSTRACT

A system for and method of, increasing provisionable bandwidth in a multiplexed communication link and a network management system incorporating the system or the method. In one embodiment, the system includes: (1) a defragmentation calculator that calculates a defragmentation of the communication link, the defragmentation containing at least one granularity, (2) a candidate slot selector, associated with the defragmentation calculator, that finds reduced cost candidate slots for the at least one granularity and (3) a circuit mover, associated with the candidate slot selector, that identifies target slots into which circuits occupying the candidate slots can be moved.

20 Claims, 5 Drawing Sheets

*FIG. 5A*

> MöbiPack Phase II
>
> Input: Link capacity N terms of number of STS-1 slots. The demand set D, map $\Psi$ and granularity set G (Section 2) and the ODF set.
>
> Output: List L of demands to be moved and bit mask $BM_i$ corresponding to granularity i.
>
> 1. Let $g_j$ be the highest granularity, such that the ODF value $o_j$ corresponding to $g_j$ is non-zero in ODF set.
> 2. Let BM be a bit mask of size of N initialized to 0. Set list L of demands to be moved to Null.
> 3. For all demands d of size $g_j$ or higher, mark all bits from t to t + $g_{j-1}$ as 1 in BM, where $\Psi(d) = (t)$ and d is of granularity $g_j$.
> 4. For each possible start of a demand of granularity $g_j$, determine if the corresponding bit in BM is set or not. If not set, determine the number of demands that need to be moved if $g_j$ consecutive slots starting from current slot need to be freed. Create a list of such values for all possible start locations.
> 5. Sort the list obtained above and find the first $o_j$ elements of it. These are the slots that will be freed for granularity of $g_j$. Append all the demands currently using these slots to list L of demands to be moved.
> 6. Save BM as $BM_j$.
> 7. Mark all bits of BM corresponding to the slots that have been identified in step 7 to 1.
> 8. For each demand identified as to be moved, if it is of granularity $g_a$ then increment $o_a$ by 1.
> 9. Decrement j by 1.
> 10. If $g_j$ is 1 (corresponding to STS-1) mark all bits corresponding to STS-1 slots that are in use as 1 and save mask at $BM_1$ and exit Phase II.
> 11. Go to step 4.

*FIG. 5B*

> MöbiPack Phase II
>
> Input: List L of demands to be moved and bit mask $BM_i$ corresponding to granularity i.
>
> Output: List M of sequence of <demand, old-slot, new-slot> bridge-n-roll moves.
>
> 1. Sort demands in L in increasing order of their granularity.
> 2. For each demand d in L of granularity $g_d$, find a free and valid slot no disallowed by mask $BM_d$. Append <d, old-slot, new-slot> to M.
> 3. Moving all demands in L to new slots identified in M will produce an optimally defragmented frame with an overhead of |L| moves.

SYSTEM AND METHOD FOR INCREASING PROVISIONABLE BANDWIDTH IN TIME-DIVISION MULTIPLEXED COMMUNICATION LINKS

TECHNICAL FIELD OF THE INVENTION

The present invention is directed, in general, to multiplexed communication links and, more specifically, to a system and method for increasing provisionable bandwidth in time-division multiplexed communication links.

BACKGROUND OF THE INVENTION

Synchronous Optical Networking (SONET) and Synchronous, Digital Hierarchy (SDH) are optical network standards. SONET and SDH use Time Division Multiplexing (TDM) to subdivide the bandwidth of an optical channel into smaller usable fragments called "time slots." SONET and SDH provide a hierarchy of bandwidth granularities, specified as "STS-n," that can be provisioned as end-to-end paths in an optical network. Higher bandwidth granularities are integer multiples of the lower bandwidth granularities (e.g., STS-1, STS-3c, STS-12c, STS-48c and so on for SONET).

SONET (see, ANSI standards document T1.105-2001, "Synchronous Optical Network (SONET)—Basic Description including Multiplex Structure, Rates, and Formats", ITU-T Standards document, incorporated herein by reference) applies to optical networks in North America. SDH (see, G.707—"Network Node Interface for the Synchronous Digital Hierarchy (SDH)," incorporated herein by reference) applies to optical networks in Europe and the rest of the world.

Bandwidth fragmentation is a well-known network engineering issue in service provider transport networks. Communication links in the networks become fragmented as circuits are added and deleted over time, leaving behind "holes" in the transport pipe. Consequently, network efficiency is gradually lowered as the free bandwidth is evermore fragmented into smaller units: new, high-bandwidth circuits cannot be provisioned from the fragmented small units.

Fragmentation is a well-studied problem in computing systems going back over 30 years. In the very early computing systems (prior to the use of memory paging techniques), the main memory of a computer could become fragmented as programs got loaded into and erased from the main memory. The most common instance of fragmentation today is disk fragmentation, which causes large files to be "split" into multiple segments when contiguous free spaces on the disk are too small to hold entire files. In all cases, fragmentation impacts system efficiency, slowing system performance and leading to higher operating costs.

While the general problem of fragmentation has been addressed in various contexts, the problem of bandwidth fragmentation in optical transport networks is novel due to some unique constraints in the transport network. These constraints make prior art defragmentation solutions, such as disk defragmentation solutions, inappropriate.

The SONET and SDH standards stipulate that the bandwidth be provisioned as contiguous time slots on the link. (Due to their similarity from a defragmentation standpoint, only SONET will be referred to hereinafter, with the understanding that SDH is included.) For example, an STS-3c and an STS-12c circuit require three and 12 contiguous time slots of STS-1 level granularity respectively, STS-1 being the lowest cross-connect rate.

The provisioning of contiguous time slots is typically referred to as "contiguous concatenation." As a consequence, fragmentation of a link can cause a new demand to be denied, even though sufficient number of slots exist, because they are noncontiguous.

This "lost" bandwidth can be recovered via a defragmentation operation that reengineers the circuits to new time slots in order to collate the free slots. A new standard called "virtual concatenation" (see, G.707, supra.) has been proposed in ITU-T to avoid the fragmentation problem by eliminating the contiguous slot requirement. However, until all edge network elements support the standard, fragmentation will remain a serious issue for SONET networks.

Link defragmentation has come to the fore with the advent of grooming cross-connect switches that enable an incoming signal passing through a node to be switched to any other time slot (Time Slot Interchange). While SONET networks have been traditionally engineered as rings, grooming switches have enabled mesh topologies consisting of these switches interconnected by wavelength division multiplexing (WDM) line systems. Since time slot interchange (TSI) meshes (or rings) enable a circuit to take any slot on each link along the path, each link can be defragmented independently to locally improve bandwidth efficiency.

The traditional approach in any defragmentation problem is a "push to the wall," or PW, operation that moves all existing demands to one end of the container. Referring initially to prior art FIGS. 1A and 1B, shown are two such examples in the context of a SONET link. FIG. 1A shows the fragmented state of two links 110, 120 connecting a pair of nodes 130, 140. Thin lines, e.g., lines 150, 160 inside each link 110, 120, represent existing circuits. FIG. 1B shows the state of the links 110, 120 after a PW operation on each link 110, 120 independently. Such defragmentation is referred to as "intra-link defragmentation."

Defragmentation may also occur across multiple links between the same pair of nodes (so-called "inter-link defragmentation"). Turning now to FIG. 1C, shown is the outcome of such an operation. Besides the normal motivation of creating contiguous free slots, inter-link defragmentation may also be performed to free a link 110, 120 so it can be disabled for maintenance.

The success of the defragmentation process is dependent on two metrics—the gain from defragmentation (the recovery of previously unprovisional time slots) and the "cost" of achieving the gain. In the SONET context, the cost of defragmentation is the number of circuits that move to new slots. Unlike the other instances of defragmentation such as memory and disk defragmentation, cost is a critical issue. This is because the service provider can defragment a live network and any circuit move increases the potential for traffic disruption.

Consequently, the goal of any defragmentation algorithm is not only to defragment a link optimally, but to also do it while attempting to minimize the number of circuit moves. Thus, while the PW operation suffices in other environments as a defragmentation mechanism, it is inappropriate here since it is not always the most cost effective. Accordingly, what is needed in the art is a way to defragment multiplexed communication links that takes into account the cost of defragmenting.

SUMMARY OF THE INVENTION

To address the above-discussed deficiencies of the prior art, the present invention provides a system for and method of, increasing provisionable bandwidth in a multiplexed communication link and a time-division multiplexer incorporating the system or the method. In one embodiment, the system includes: (1) a defragmentation calculator (which may be an optimum defragmentation calculator) that calculates a defragmentation (perhaps an optimum defragmentation) of the communication link, the defragmentation containing at least one granularity, (2) a candidate slot selector, associated with the defragmentation calculator, that finds reduced (and perhaps minimum) cost candidate slots for the at least one granularity and (3) a circuit mover, associated with the candidate slot selector, that identifies target slots into which circuits occupying the candidate slots can be moved.

The present invention introduces the broad concept of determining how to pack a link so as to free up bandwidth at a reduced cost. Knowledge of the optimal packing structure is a necessary step in any defragmentation process when cost is a concern. Transitioning a link from its current state to a defragmented one with the minimal cost appears to be theoretically hard (intractable and perhaps NP-hard) and may be difficult to achieve in practical applications. Nonetheless, an optimal defragmentation algorithm is disclosed herein and guarantees an optimal defragmentation. An alternative defragmentation algorithm disclosed herein achieves optimal packing in polynomial time, with a very low deviation of 10-30% from the minimal cost.

Further disclosed is an algorithm that determines the least cost transition to a defragmented state for any link and use it as a benchmark to compare the performance of the disclosed algorithm. This algorithm is adequate for service provider networks of today.

In one embodiment of the present invention, the candidate slot selector disqualifies slots containing "nailed-down" circuits from being the candidate slots. In another embodiment of the present invention, the candidate slot selector finds only aligned slots as candidate slots for the at least on granularity.

In yet another embodiment of the present invention, the at least one granularity is a plurality of granularities related to one another as integer multiples. Therefore, the system of the present invention can, in various embodiments, defragment a link without disturbing nailed-down circuits, ensure that candidate slots are aligned and deal with granularities of different size that are integer multiples of a minimum granularity.

In one embodiment of the present invention, the multiplexed communication link is time-division multiplexed and the slots are time slots. Thus, a time-division multiplexer constructed in accordance with the principles of the present invention will further be disclosed.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIGS. 5A and 5B illustrate pseudocode program listings of portions of an algorithm incorporated in the method of FIG. 4;

DETAILED DESCRIPTION

Before describing an algorithm suitable for defragmenting a multiplexed communications link, some preferred, but not required, attributes of the disclosed algorithm will be set forth.

First, the algorithm should preferably be able to handle both intra-link and inter-link defragmentation requests. While the algorithm should preferably be able to accommodate links of different sizes, they should have similar traffic engineering (TE) and reliability (SRG) constraints as between the same pair of nodes.

Second, since defragmentation occurs in a live network, the operation should preferably not disrupt traffic flow. In other words, the algorithm should preferably not require circuits to be first torn down to achieve packing. Instead, the algorithm's output should enable a sequence of "bridge-n-roll" operations to transition circuits seamlessly to new time slots. Of course, in order for the operation to be disruption free, the network element (NE) needs to provide bridge-n-roll support.

The bridge-n-roll operation works as follows. The NE at one end "bridges," or replicates, the traffic on the new slot. The NE at the other end now receives the data on both the old and new slots and "merges," or selects between, the two signals to choose one. To enable a circuit "move," or a transition to a new slot, the circuit is first bridged and merged and then the cross-connects on the old slots are released leading to a disruption-free transition to the new slot.

Third, the cost of the defragmentation operation is determined by the number of circuit moves and should preferably be minimized. This is because a failure during the move can have deleterious effects on the network—(1) it can bring down the circuit performing the bridge-n-roll operation and (2) since a bridge operation temporarily uses up twice the number of slots failure during this time can lower the available bandwidth on the link, in turn impacting the restoration capacity.

Fourth, service providers often have high priority circuits whose disruption imposes serious penalties and thus, the defragmentation algorithm should preferably also be able to account for "nailed down" circuits that need to be left untouched in the defragmentation process.

It is this "cost" criterion that in part differentiates the link fragmentation problem from earlier disk and memory fragmentation solutions. While it is straightforward to determine the optimal packing structure given a set of circuits, determining the fewest number of moves required to reach the optimal packing structure is an NP-hard problem. Consequently, the goal of the disclosed algorithm is to defragment optimally while minimizing this moving cost.

Figure 2:
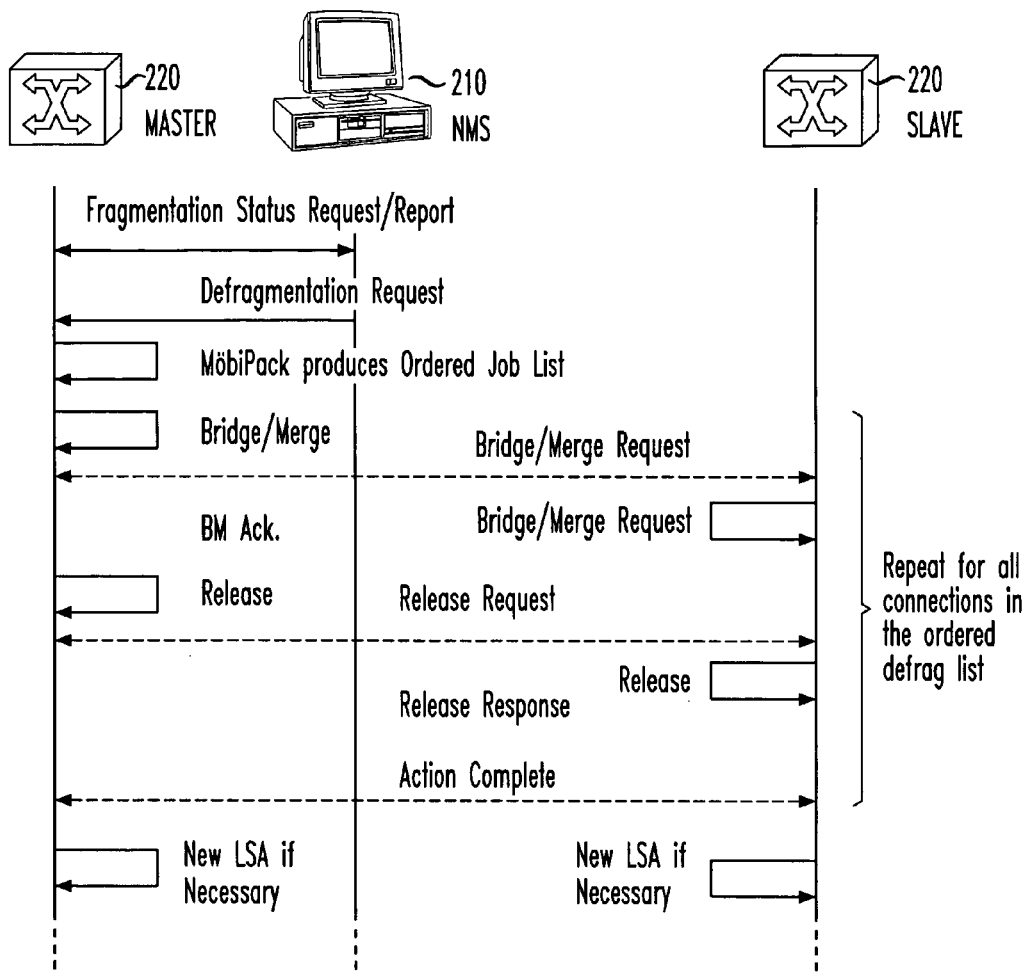
FIG. 2 illustrates a schematic of a complete link defragmentation operation.

FIG. 2 provides a schematic of a complete link defragmentation operation. On the request of an NMS 210, a link defragmentation algorithm (LDA) operating in the NMS 210 provides a sequence of circuits to be moved and their new locations. The NMS 210 then uses this list to move the circuits, one at a time, to their new slots by a bridge-n-roll operation as between a master cross-connect 220 and a slave cross-connect 230 (both NEs). Specific portions in the bridge-n-roll operation will not be detailed here, because they are not bear on an understanding of the present invention and are familiar to those skilled in the pertinent art.

A SONET network imposes a set of constraints on the network traffic, and the illustrated embodiment of the algorithm honors these constraints and operates under them. The first constraint is a containment property. The disclosed algorithm assumes that the bandwidth demands of new circuits follow the SONET standard and thus are multiples of each other. In other words, the SONET standard calls for STS-<1,3,12,48,192,768>c and so on. Each higher granularity is an integer multiple of each lower granularity. It will be assumed for simplicity that the lowest granularity timeslot is STS-1. Therefore, a demand requiring three slots implies an STS-3c circuit.

The second constraint is an alignment property. This states that the time slot for each new circuit demand is aligned to specific pre-determined boundary. For example, a STS-3c circuit can only start on slots 1,4,7,10,13 and so on, a STS-48c circuit can only start on slots 1,49,97,145 and so on. Formally, a slot number s is a candidate for starting slot for circuit of bandwidth d if, and only if, (s mod d)≡1.

The SONET defragmentation problem will now be formally defined. Assuming a link of capacity n (i.e., an STS-n link divided into n STS-1 slots), a set of circuits D={$d_1$, $d_2$, ... $d_k$} and a map $\Psi$={$d_i \rightarrow t_i$} where $t_i$ is slot number at which demand $d_i$ starts. The bandwidth $s_i$ of each circuit $d_i$ is one of the SONET granularities, i.e., $s_i \in$ {1,3,12,48, 192. . . }. As highlighted above, since the SONET traffic follows the alignment property, the slot $t_i$ is such that ($t_i$ mod $s_i$)≡1. The defragmentation problem is thus defined as finding a new map $\Psi'$={$d_i \rightarrow t_i'$} that satisfies the alignment property and that "optimally packs" the link.

A link is defined as being "optimally packed" if demands occupying the link are arranged such that the link can be filled completely to capacity with the fewest number of new circuit demands. The optimal packing ensures that it will satisfy any new demand set that can be satisfied by any other arrangement of current demands.

Figure 1B:
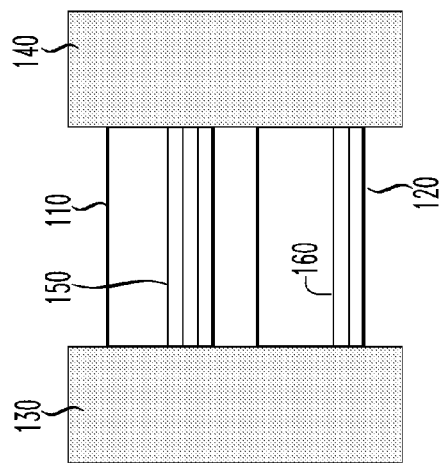
FIGS. 1A, 1B, and 1C illustrate a prior art PW approach to a link defragmentation problem.
Figure 1A:
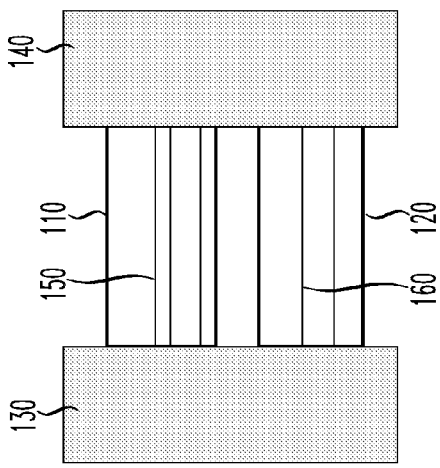
Figure 1C:
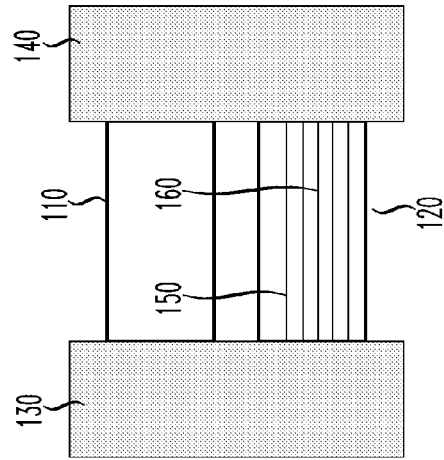

The goal of any defragmentation operation is to create a link that is optimally packed. A link can, however, be optimally packed multiple ways. The traditional approach is to perform a PW operation as shown in FIG. 1. As an aside, though PW is itself straightforward, the order in which bridge-n-roll circuit moves are performed in a PW operation is not.

Figure 3:
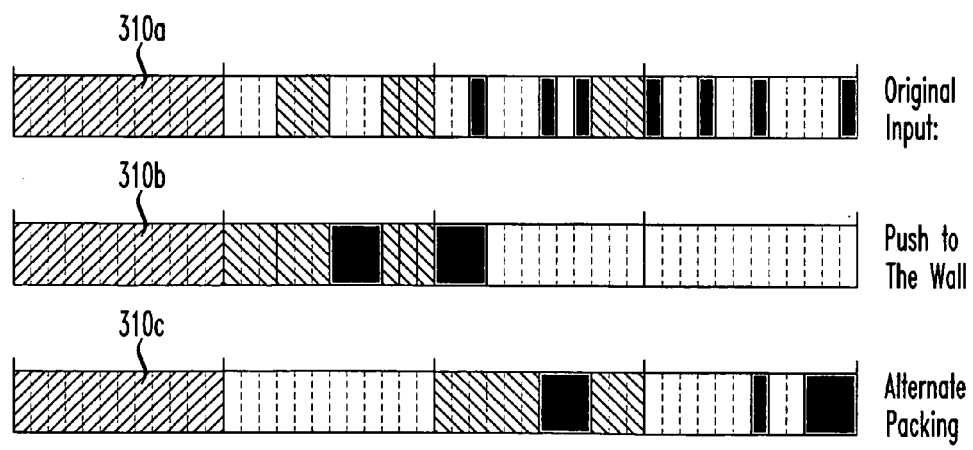
FIG. 3 illustrates slots on a single link to demonstrate the complete link defragmentation operation of FIG. 2.

FIG. 3 illustrates the slots on a single link to further demonstrate this. FIG. 3 shows an OC-48 link 310a that is fragmented by existing demands. The PW operation moves all circuits to one end as shown in an OC-48 link 310b. It is straightforward to see that the OC-48 link 310b is optimally packed since it contains no "holes." It should also be apparent that achieving this optimal packing structure requires seven circuit moves (as stated above, however, the order in which the circuit moves occur may not be as apparent).

Consider now the OC-48 link 310c in FIG. 3. Note that it is also optimally packed. This can be verified by noting that the same set of demands that fill the PW frame to capacity (one STS-12c slot, two STS-3c slots and two STS-1 slots) also do the same in this case. More importantly, only five circuit moves are required for the transition from the original OC-48 link 310a, two fewer than the OC-48 link 310b than was subjected to a mere PW operation. Consequently, given that both the OC-48 links 310b, 310c exhibit optimal packing, the OC-48 link 310c is preferable, since it incurs a lower transition cost. Thus, a PW operation is not the preferable solution in this environment.

The example in FIG. 3 demonstrated that a link can be optimally packed multiple ways. The goal of defragmentation is to reach optimality while incurring the smallest number of bridge-n-roll operations. It will be noted, however, that among all the ways to optimally pack the existing demands in a link, determining the one among them that requires fewest circuits to move appears to be theoretically hard (intractable, and perhaps NP-hard).

To work around the intractability of the problem, the disclosed algorithm uses a heuristic to determine the optimal packing structure that incurs a low cost of movement. After presenting the algorithm and describing its operation, performance numbers will be presented that show that the heuristic is indeed accurate and competitive with the optimal.

Based on the optimality definition, one needs to know the fewest set of demands that would completely fill up a link if it were optimally packed. Stated differently, the defragmentation algorithm needs to create "optimal defragmentation" (ODF) of free space mirroring each of these demands in the set. Thus, the OC-48 link 310a in FIG. 3 would have an optimally defragmented configuration if it had an empty STS-12c slot, two empty STS-3c slots and two empty STS-1 slots after the defragmentation process.

The disclosed algorithm works in three phases:

(I) optimal defragmentation calculation, in which the optimal defragmentation of the link(s) is calculated.

(II) free slot selection in which, for each granularity, minimum cost candidate slots of that granularity that should be freed are found. The cost of freeing a candidate slot may be defined based on the number of circuits that need to be moved or the granularity of circuits that need to be moved.

(III) circuit movement, in which are determined the slots into which the circuits identified in phase II can be moved without affecting earlier-cleared slots.

Figure 4:
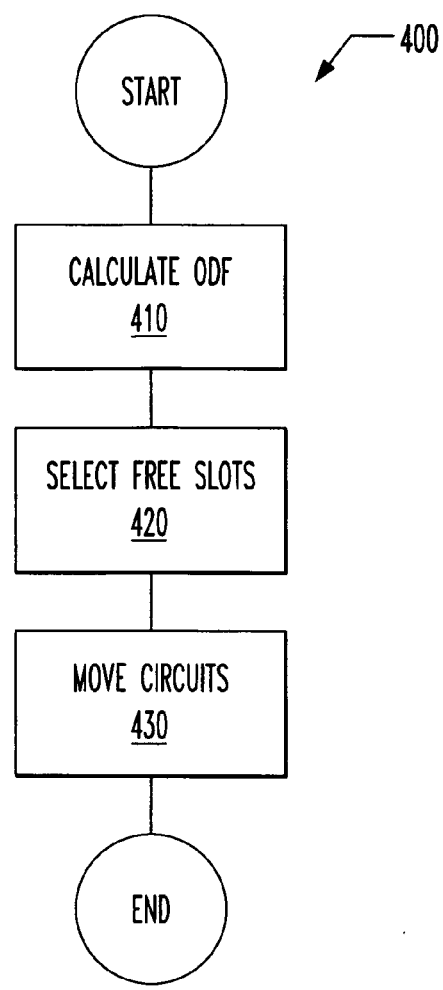
FIG. 4 illustrates a flow diagram of a method of increasing provisionable bandwidth in a multiplexed communication link carried out according to the principles of the present invention.

Turning now to FIG. 4, illustrated is a flow diagram of a method, generally designated 400, of increasing provisionable bandwidth in a multiplexed communication link carried out according to the principles of the present invention. Each of the three above-mentioned phases will now be described in greater detail with reference to FIG. 4.

Phase I: ODF Calculation

To calculate the ODF (a step 410 of the method 400), the optimal breakup of free space should be computed. To determine the number of slots that can be freed for the lowest granularity, the number of slots of that granularity that are present in the system and how many of them are being used should be determined. For any higher granularity, the slots that can be freed depend on how many slots of that granularity are present in that system and how many slots can be created. This is done in the illustrated embodiment by combining the free slots of lower granularity (since each higher granularity is a multiple of the lower granularity).

For a single link or same-sized multiple links with no nailed down circuits, the ODF computation may be simplified. First calculate the total number of free slots, S. S is divided by the first SONET granularity on the link(s) that is less than S to yield the number of circuits of that granularity in the ODF set. This operation is repeated with the remainder on the next lower granularity and so on. Thus, with 20 free slots in the link 310a of FIG. 3, the ODF set was 1 STS-12c, 2 STS-3c (from the remainder of 8) and 2 STS-1 (from the remainder of 2).

If some circuits are nailed down and cannot be moved by the defragmentation operation or if links are of different sizes, the ODF cannot be calculated by merely dividing the total number of free slots by the granularity. In case of nailed down circuits, the availability of free slots by itself is not enough to create a free slot of higher granularity due to the inability to move these circuits. In case of links of different sizes, the availability of free slots by itself is not enough to create higher granularity slots, as some links may not provide a cross-connect at the higher granularity. A general formula for the ODF can now be derived.

Let $D_g$ equal the number of demands of SONET granularity (XCRate) g in all the links. Let $F_{x,y}$ equal XCRate x/XCRate y. Let $P_g$ equal the total number of possible slots of XCRate g in all of the links. Finally, let $U_g$ equal the total number of slots of XCRate g that are taken by the demands of XCRate g and higher. Thus $U_g = D_g + \Sigma U_x \star F_{x,g}\ \forall x$, where XCRate x>XCRate g.

Let $A_g$ equal the total number of slots of XCRate g that can be freed across all links. Then, $A_g = \min(A_{g-1}/F_{g,g-1}, P_g - U_g)$. Using $A_g$, $C_g$ (the contribution of XCRate g on the ODF) is computed as follows:

$$C_g = A_g - A_{g+1} \star F_{g+1,g}$$

This formula then provides the ODF.

Phase II: Free Slot Selection

Given that the ODF set is available from phase I, specific slots can now be chosen to be "cleared" to achieve the required set of contiguous free slots (a step 420 of the method 400). If intractability is desired to be avoided, this may be achieved by a greedy heuristic that chooses at each SONET granularity level, the requisite number of slots of that granularity whose clearing would require the fewest circuits to move. The slots that contain nailed down circuits are not considered for clearing.

Multiple links are combined into one "megalink" by linearly concatenating them. Appropriate slots are marked with highest circuit rate supported based on granularity of the link and adjacency of nailed down circuits. The algorithm operates on a link that may be a "megalink" or a single link. Pseudocode that reflects this algorithm is presented in FIG. 5A.

At the end of phase II, the list of demands L that need to be moved to create the optimal breakup of free space is determined. In addition, for each demand in L, a set of slots is identified (determined by a bit mask corresponding to its granularity level) to which this demand may not be moved into. This is to ensure that the slots cleared for a higher granularity are not fragmented again by moving a demand of a lower granularity into those slots. Note that in step 8 of FIG. 5A, it is apparent from the way mask $BM_j$ is obtained, that all demands to be moved to free up space for granularity $g_j$ will be of granularity lower than $g_j$. This dependency in movement is accounted for by adding all these lower granularity demands to be moved to the ODF value. The recursion breaks at lowest granularity where a demand can be moved anywhere as long as one slot is free.

Phase III: Circuit Movement

Now it comes time to move circuits (a step 430 of the method 400). The list L identifies all demands that need to be moved to create the required set of contiguous free slots to account for the ODF set. The bit map corresponding to each granularity also highlights the slots available to move each of these demands into. Starting with the lowest granularity (STS-1) and working up, free slots provably exist to accommodate the demands to be moved. In other words, sufficient free single slots exist to move the STS-1 demands in L. The movement of these STS-1s will in turn create sufficient three-slot spaces for STS-3 demands and so on. Pseudocode that reflects this algorithm is presented in FIG. 5B.

The disclosed algorithm results in optimal packing of demands, but does not guarantee minimum number of movements. For this reason, an alternative algorithm that achieves optimal packing in optimal number of moves will now be disclosed. Due to the perceived inherent complexity of the problem, this scheme involves an exhaustive search, but its running time can be curtailed by employing effective pruning mechanisms.

The algorithm takes the solution of the above-disclosed three-phase algorithm as the currently-known best solution and tries to improve up on it by exhaustively searching the solution space. The algorithm is similar to phase II, pseudocode for which is set forth in FIG. 5A. Except now instead of looking greedily for the local best as in step 5 thereof, it explores all possible combinations at each granularity level by recursively invoking the same function. Any exploration that incurs more moves then the current best, is abandoned. The movement step is same as phase III of the disclosed algorithm (FIG. 5B).

Figure 6:
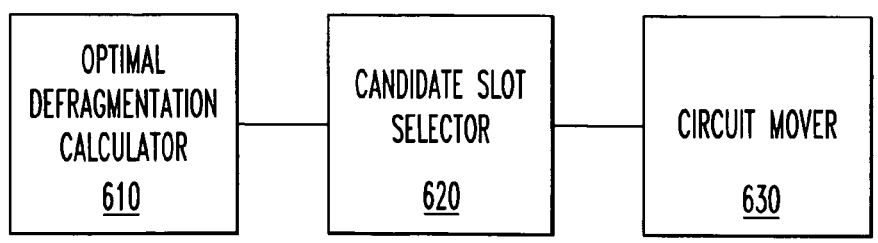
FIG. 6 illustrates a block diagram of a system for increasing provisionable bandwidth in a multiplexed communication link constructed according to the principles of the present invention.

Turning now to FIG. 6, illustrated is a block diagram of a system for increasing provisionable bandwidth in a multiplexed communication link constructed according to the principles of the present invention.

The system, generally designated 600, includes an optimal defragmentation calculator 610. The optimal defragmentation calculator 610 calculates an optimal defragmentation of the communication link that is to be defragmented. The optimal defragmentation contains at least one granularity (STS-1, STS-3c, STS-12c, etc.). In the specific communication link, the at least one granularity is a plurality of granularities related to one another as integer multiples (obeying the containment property described above).

The system 600 also includes a candidate slot selector 620. The candidate slot selector 620 is associated with the optimal defragmentation calculator 610 and finds minimum cost candidate slots for the at least one granularity.

The system 600 further includes a circuit mover 630. The circuit mover 630 is associated with the candidate slot selector 620 and identifies target slots into which circuits occupying the candidate slots identified by the candidate slot selector 620 can be moved.

In the system 600 of FIG. 6, the candidate slot selector 620 is configurable to determine the cost of a candidate slot based on either of (1) a number of circuits to be moved or (2) a granularity of circuits to be moved.

The candidate slot selector 620 respects the optional constraints described above. More specifically, the candidate slot selector 620 disqualifies slots containing nailed-down circuits from being the candidate slots and further finds only aligned slots as candidate slots for said at least on granularity (obeying the alignment property).

Figure 7:
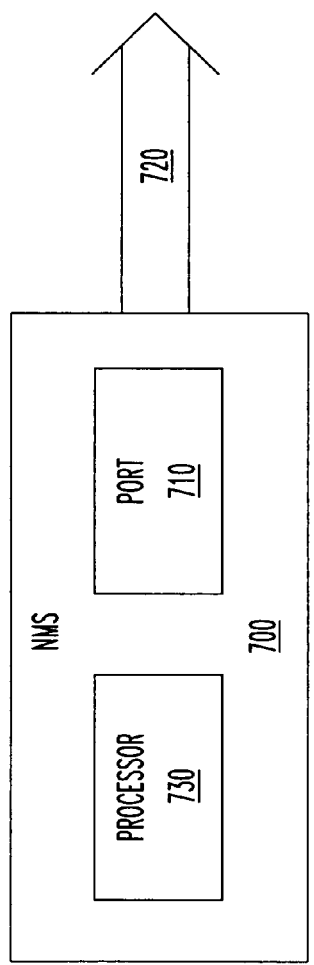
FIG. 7 illustrates a block diagram of a network management system (NMS) that incorporates the method of FIG. 4 or the system of FIG. 6.

Turning now to FIG. 7, illustrated is a block diagram of an NMS that incorporates the method of FIG. 4 or the system of FIG. 6. The NMS, generally designated 700, includes a port 710 couplable to an optical communication link 720. (The optical communication link 720 may be a SONET or SDH link and is environmental to the NMS 700. The NMS 700 further includes a processor 730 coupled to the port 710. The processor 730 allocates time slots of the optical communication link 720 to discrete communication channels to effect a multiplexing of the channels over the optical communication link 720. The processor 730 executes a sequence of software instructions (not referenced) that carries out the method 400 of FIG. 4 or embodies the system 600 of FIG. 6. Those skilled in the pertinent art understand, however, that the NMS 700 may carry out or embody the method 400 or the system 600 with dedicated hardware in lieu of or in addition to the processor 730 and sequence of instructions.

Having discussed ways to embody the disclosed algorithm, its performance will now be evaluated in terms of the number of moves required to create a defragmented frame. Recall that optimizing the number of moves is intractable and perhaps NP-hard. While no known polynomial time algorithm exists to determine the optimal number of moves, the optimal number of moves may be found by an exhaustive search procedure as given in previous section.

Figure 8:
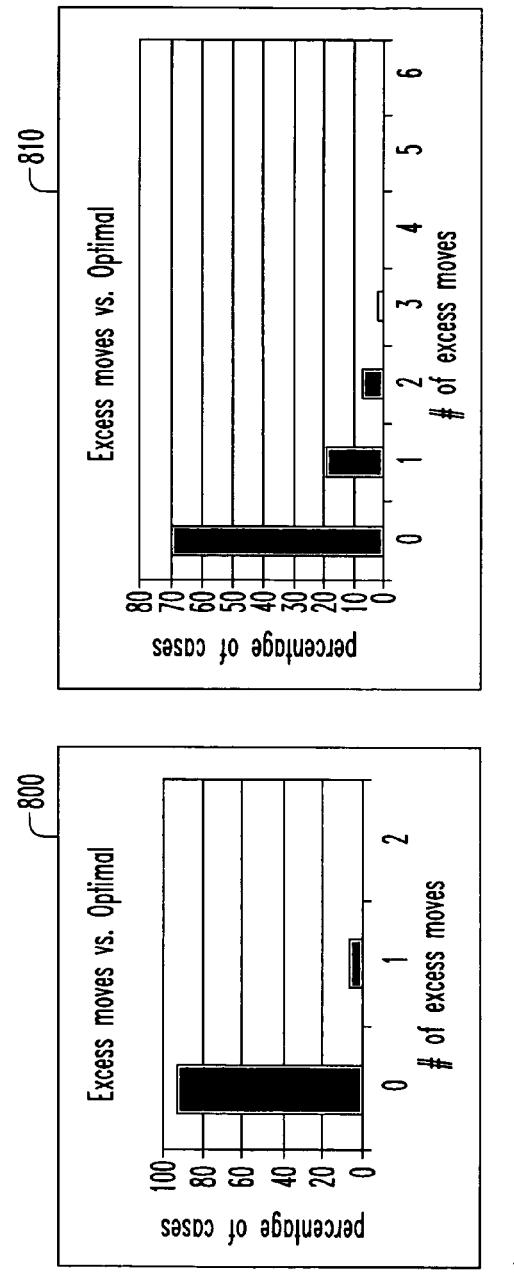
FIG. 8 illustrates a pair of graphs showing the performance of the heuristic relative to the optimal algorithm with respect to STS-48 and STS-192 links.

Turning now to FIG. 8, illustrated are graphs 800, 810 that show how well the heuristic performs against the optimal algorithm for STS-48 (the graph 800) and STS-192 (the graph 810) links. The tests are based on 2000 randomly generated frames. The graphs 800, 810 show that the heuristic's performance is extremely good, matching the optimal number of moves in 95% and 70% of the cases for the OC-48 and OC-192 links respectively. For the remainder of the cases, the heuristic is only a few moves away from optimal algorithm, making the heuristic an optimal defragmentation algorithm with near-optimal cost.

Although the present invention has been described in detail, those skilled in the art should understand that they can make various changes, substitutions and alterations herein without departing from the spirit and scope of the invention in its broadest form.

What is claimed is:

1. A system for increasing provisionable bandwidth in a multiplexed communication link, comprising:
   a defragmentation calculator that calculates a defragmentation of said communication link, said defragmentation containing at least one granularity;
   a candidate slot selector, associated with said defragmentation calculator, that finds lower cost candidate slots for said at least one granularity; and
   a circuit mover, associated with said candidate slot selector, that identifies target slots into which circuits occupying said candidate slots are moved.

2. The system as recited in claim 1 wherein said candidate slot selector determines a cost of a candidate slot based on one of:
   a number of circuits to be moved; and
   a granularity of circuits to be moved.

3. The system as recited in claim 1 wherein said candidate slot selector disqualifies slots containing nailed-down circuits from being said candidate slots.

4. The system as recited in claim 1 wherein said candidate slot selector finds only aligned slots as candidate slots for said at least on granularity.

5. The system as recited in claim 1 wherein said at least one granularity is a plurality of granularities related to one another as integer multiples.

6. The system as recited in claim 1 wherein said multiplexed communication link is time-division multiplexed and said slots are time slots.

7. The system as recited in claim 1 wherein said multiplexed communication link is one of:
   a SONET link; and
   an SDH link.

8. A method of increasing provisionable bandwidth in a multiplexed communication link, comprising:
   calculating a defragmentation of said communication link, said defragmentation containing at least one granularity;
   finding reduced cost candidate slots for said at least one granularity; and
   identifying target slots into which circuits occupying said candidate slots are moved.

9. The method as recited in claim 8 wherein finding comprises determining a cost of a candidate slot based on one of:
   a number of circuits to be moved; and
   a granularity of circuits to be moved.

10. The method as recited in claim 8 wherein said finding comprises disqualifying slots containing nailed-down circuits from being said candidate slots.

11. The method as recited in claim 8 wherein said finding comprises finding only aligned slots as candidate slots for said at least on granularity.

12. The method as recited in claim 8 wherein said at least one granularity is a plurality of granularities related to one another as integer multiples.

13. The method as recited in claim 8 wherein said multiplexed communication link is time-division multiplexed and said slots are time slots.

14. The method as recited in claim 8 wherein said multiplexed communication link is one of:
   a SONET link; and
   an SDH link.

15. A network management system, comprising:
   a port couplable to an optical communication link;
   a processor, coupled to said port, for allocating time slots of said optical communication link to discrete communication channels; and
   a system for increasing provisionable bandwidth in said optical communication link, including:
      a defragmentation calculator that calculates a defragmentation of said optical communication link, said defragmentation containing at least one granularity,
      a candidate slot selector, associated with said defragmentation calculator, that finds reduced cost candidate time slots for said at least one granularity, and
      a circuit mover, associated with said candidate slot selector, that identifies target time slots into which circuits occupying said candidate time slots are moved.

16. The network management system as recited in claim 15 wherein said candidate slot selector determines a cost of a candidate slot based on one of:
   a number of circuits to be moved; and
   a granularity of circuits to be moved.

17. The network management system as recited in claim 15 wherein said candidate slot selector disqualifies time slots containing nailed-down circuits from being said candidate time slots.

18. The network management system as recited in claim 15 wherein said candidate slot selector finds only aligned time slots as candidate time slots for said at least on granularity.

19. The network management system as recited in claim 15 wherein said at least one granularity is a plurality of granularities related to one another as integer multiples.

20. The network management system as recited in claim 15 wherein said multiplexed communication link is one of:
   a SONET link; and
   an SDH link.

* * * * *